United States Patent
So et al.

(10) Patent No.: US 12,047,639 B2
(45) Date of Patent: Jul. 23, 2024

(54) HARMONIZATION OF VIDEO FORMATS FOR VIDEO INGESTION

(71) Applicant: Hewlett-Packard Development Company, L.P., Spring, TX (US)

(72) Inventors: Chi Wai So, Spring, TX (US); Owen Patrick Columbus, Spring, TX (US); David Quijano, Spring, TX (US); Stacy L. Wolff, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/770,067

(22) PCT Filed: Oct. 31, 2019

(86) PCT No.: PCT/US2019/059257
§ 371 (c)(1),
(2) Date: Apr. 19, 2022

(87) PCT Pub. No.: WO2021/086385
PCT Pub. Date: May 6, 2021

(65) Prior Publication Data
US 2022/0400311 A1   Dec. 15, 2022

(51) Int. Cl.
H04N 21/4402 (2011.01)
G09G 5/00 (2006.01)
H04N 21/4363 (2011.01)

(52) U.S. Cl.
CPC ..... *H04N 21/440218* (2013.01); *G09G 5/005* (2013.01); *H04N 21/43635* (2013.01); *G09G 2370/12* (2013.01); *G09G 2370/20* (2013.01)

(58) Field of Classification Search
CPC ..... H04N 21/440218; H04N 21/43635; H04N 7/15; H04N 7/147; G09G 5/005; G09G 2370/12; G09G 2370/20; G09G 2340/04
(Continued)

(56) References Cited

U.S. PATENT DOCUMENTS 7,039,116 B1 * 5/2006 Zhang ................ H04N 21/2662
375/240.26
7,187,418 B2   3/2007 Phillips et al.
(Continued)

FOREIGN PATENT DOCUMENTS

| CN | 208798084 U | 4/2019 |
| EP | 3222038 A1 | 9/2017 |
| WO | 2012/032136 A1 | 3/2012 |

OTHER PUBLICATIONS

Ingest Funnel, "Fast and simplified file ingest," EVS Group, Aug. 30, 2019, 4 pages.
(Continued)

*Primary Examiner* — John W Miller
*Assistant Examiner* — Sean N. Haiem
(74) *Attorney, Agent, or Firm* — Quarles & Brady LLP

(57) ABSTRACT

Example video ingestion cables, display systems, and methods for harmonizing video formats for video ingestion are provided. An example video ingestion cable includes a first video interface connector cable to receive a first video feed formatted according to a first video format, a second video interface connector cable to receive a second video feed formatted according to a second video format, a format conversion circuit to convert the first video feed or the second video feed to a harmonized video format, and an output interface connector to transmit one of the first video feed and the second video feed as an output video feed formatted according to the harmonized video format to a display device. An example display system includes first and second video ingestion cables and a video ingestion circuit to select an input video feed for display.

20 Claims, 4 Drawing Sheets

(58) Field of Classification Search
USPC ........................................................ 348/441
See application file for complete search history.

(56) References Cited

U.S. PATENT DOCUMENTS

| | | | |
|---|---|---|---|
| 8,400,441 B2 | 3/2013 | Kim | |
| 8,695,054 B2 | 4/2014 | Trimper et al. | |
| 9,049,420 B1 | 6/2015 | Wang et al. | |
| 9,164,930 B2* | 10/2015 | Zeng | G06F 13/14 |
| 2007/0103204 A1* | 5/2007 | Egan | H03K 19/00346 |
| | | | 327/100 |
| 2007/0109574 A1* | 5/2007 | Savov | H04N 1/00127 |
| | | | 358/1.15 |
| 2008/0168519 A1* | 7/2008 | Rao | G06F 3/14 |
| | | | 725/127 |
| 2009/0013372 A1* | 1/2009 | Oakes | H04N 21/64746 |
| | | | 725/139 |
| 2009/0067488 A1* | 3/2009 | Skeels | H04N 21/43635 |
| | | | 348/E7.003 |
| 2009/0167946 A1* | 7/2009 | Samada | H04N 21/436 |
| | | | 348/558 |
| 2010/0253856 A1* | 10/2010 | Sato | H04N 5/765 |
| | | | 348/E5.093 |
| 2011/0116538 A1* | 5/2011 | Chuang | H04N 7/148 |
| | | | 348/441 |
| 2012/0044985 A1* | 2/2012 | Tao | H04N 21/234363 |
| | | | 348/E7.003 |
| 2013/0155206 A1* | 6/2013 | Lazarski | H04N 13/293 |
| | | | 348/51 |
| 2014/0125871 A1* | 5/2014 | Matsubayashi | H04N 5/44 |
| | | | 348/723 |
| 2014/0143797 A1* | 5/2014 | Nagasawa | H04N 21/25816 |
| | | | 725/116 |
| 2014/0362171 A1* | 12/2014 | Wall | H04N 7/147 |
| | | | 348/14.12 |
| 2014/0379941 A1* | 12/2014 | Suda | G06F 13/4252 |
| | | | 710/11 |
| 2017/0017595 A1* | 1/2017 | Schnell | G06F 13/4286 |
| 2017/0310905 A1* | 10/2017 | Gopinath | G06F 16/783 |
| 2019/0166386 A1* | 5/2019 | Barnich | H04N 21/234 |
| 2020/0106987 A1* | 4/2020 | Sarrasin | H04N 21/43635 |
| 2020/0314398 A1* | 10/2020 | Zhang | H04N 9/3141 |

OTHER PUBLICATIONS

So, C., et al., "Multi-Port Video Ingest Cable," Aug. 30, 2019, 3 pages.

* cited by examiner

HARMONIZATION OF VIDEO FORMATS FOR VIDEO INGESTION

BACKGROUND

A mobile electronic device, such as a laptop computer, tablet, or smartphone, may act as a video source to provide a video feed to be displayed at a display device. Such a mobile electronic device may natively output video through a certain interface according to a certain format which may not be compatible with the display device. However, the video feed may be converted to be compatible with the display device by a conversion a cable or dongle which can be carried along with the mobile electronic device.

DETAILED DESCRIPTION

A video feed outputted from a mobile electronic device may not be natively compatible with a display device. For example, a mobile electronic device may output video through a Universal Serial Bus Type-C port (USB-C), but the display device may only receive video through a High-Definition Multimedia Interface (HDMI) interface. In such instances, video from the mobile electronic device in the USB-C format may be converted to the HDMI format for display at the display device by a conversion cable or dongle.

However, there are a number of different interfaces which may be used by any given mobile electronic device and any given display device, and it would be unduly burdensome for user of mobile electronic devices to carry different conversion cables to prepare for each possibility of interface mismatch.

Thus, the present disclosure provides a video ingestion cable with multiple video interface connector cables to receive video feeds formatted according to different video formats and circuitry to output a video feed according to a harmonized video format to be ingested into a display device.

Figure 1:
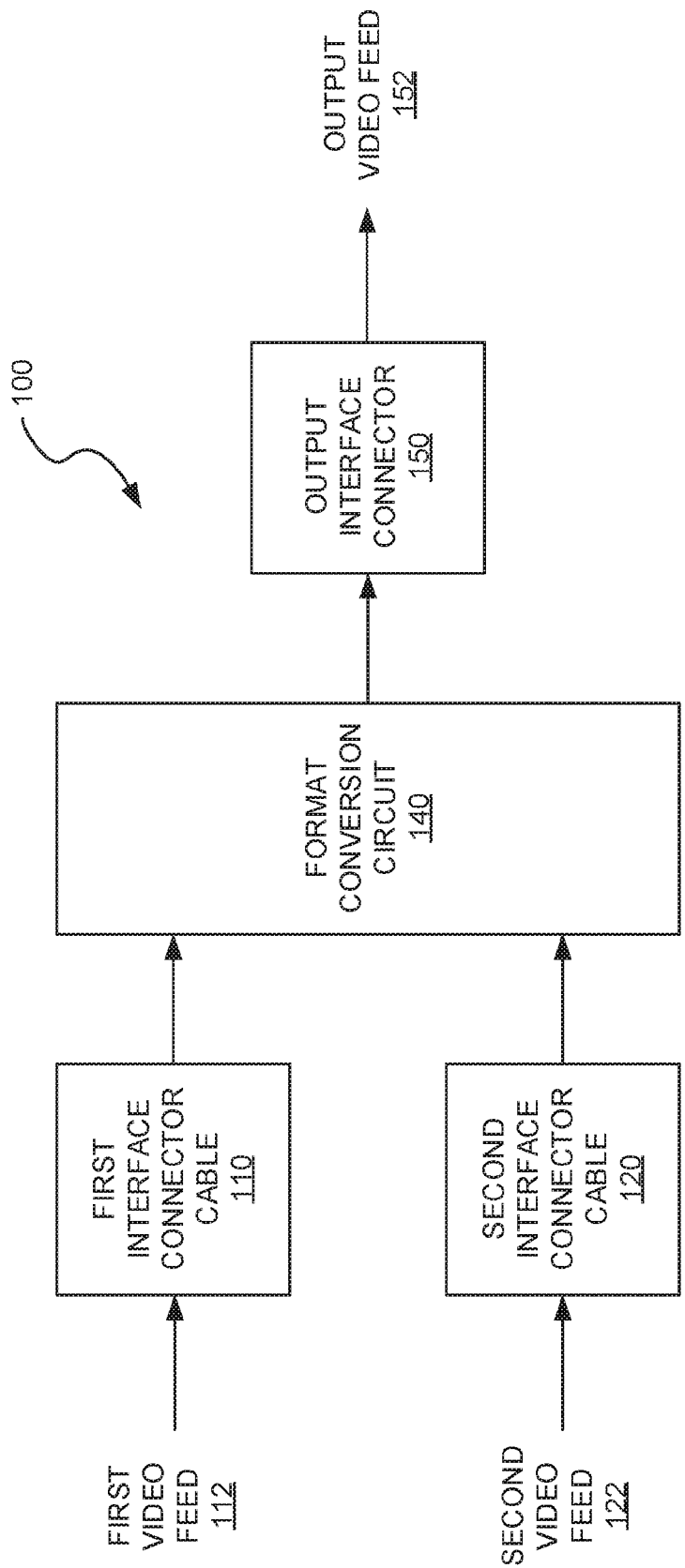
FIG. 1 is a schematic diagram of an example video ingestion cable.

FIG. 1 is a schematic diagram of an example video ingestion cable 100. The video ingestion cable 100 includes a first video interface connector cable 110 to receive a first video feed 112 formatted according to a first video format, and a second video interface connector cable 120 to receive a second video feed 122 formatted according to a second video format. The video ingestion cable 100 may include additional video interface connector cables to receive video feeds formatted according to other video formats.

For example, the first video interface connector cable 110 may include a USB-C cable to receive a video feed formatted according to the USB-C format, the second video interface connector cable 120 may include an HDMI cable to receive a video feed formatted according to the HDMI format. Other example video interface cable connectors include a DisplayPort (DP) cable to receive video formatted according to the DP format, or any other example video interface cable connector to receive a video feed of another format.

One or both of the video interface connector cables 110, 120 may include a male connector that is to interface with a female connector of a mobile electronic device or video source device, such as a laptop computer, tablet, smart phone, or other mobile electronic device capable of providing a video feed.

The video ingestion cable 100 further includes a format conversion circuit 140 to convert the first video feed 112 or the second video feed 122 to a harmonized video format, and an output interface connector 150 to transmit one of the first video feed 112 and the second video feed 122 as an output video feed 152 formatted according to the harmonized video format to a display device. That is, the format conversion circuit 140 converts at least one of, or both of, the first video feed 112 and the second video feed 122 to the harmonized video format for the output interface connector 150, and the output interface connector 150 outputs one of the video feeds 112, 122.

In some examples, one of the first video feed 112 and the second video feed 122 is natively formatted according to the harmonized video format, and therefore need not be converted. For example, if the first video feed 112 receives video in the USB-C format, the second video feed 122 receives video in the HDMI format, and the harmonized video format is the HDMI format, then the format conversion circuit 140 converts the USB-C video from the first video feed 112 to HDMI and allows the HDMI video from the second video feed 122 to pass through. In other words, the video feed that is not already formatted according to the harmonized video format is converted into the harmonized video format by the format conversion circuit 140 before being passed to the output interface connector 150, and the video feed that is already formatted according to the harmonized video format is passed through to the output interface connector 150. The output interface connector 150 is selected for compatibility with the display device to which a video feed is to be transmitted.

As mentioned above, the video ingestion cable 100 may include additional interface connector cables. For example, the video ingestion cable 100 may include a third video interface connector cable to receive a third video feed formatted according to a third video format. In such examples, the format conversion circuit 140 is to convert the third video feed to the harmonized video format, and the output interface connector 150 is to transmit one of the first video feed, the second video feed, and the third video feed as the output video feed.

The first and second video interface connectors may be physically inhibited from simultaneously connecting to more than one video source device. For example, where the video interface connectors include male connectors, the male connectors may be attached by cables that are too short to simultaneously connect to different video source devices. Alternatively, the format conversion circuit 140 may include a controller to select one of the first video feed and the second video feed as the output video feed, so that even in the case that the video ingestion cable 100 receives multiple video feeds simultaneously, a single output feed may be outputted to the display device.

Thus, a display device may be enabled to receive a harmonized video feed from multiple mobile electronic devices which natively output video feeds according to different video formats. Such a video ingestion cable 100 may be used with a display device to facilitate easier sharing of video inputs from multiple different mobile electronic devices.

Figure 2:
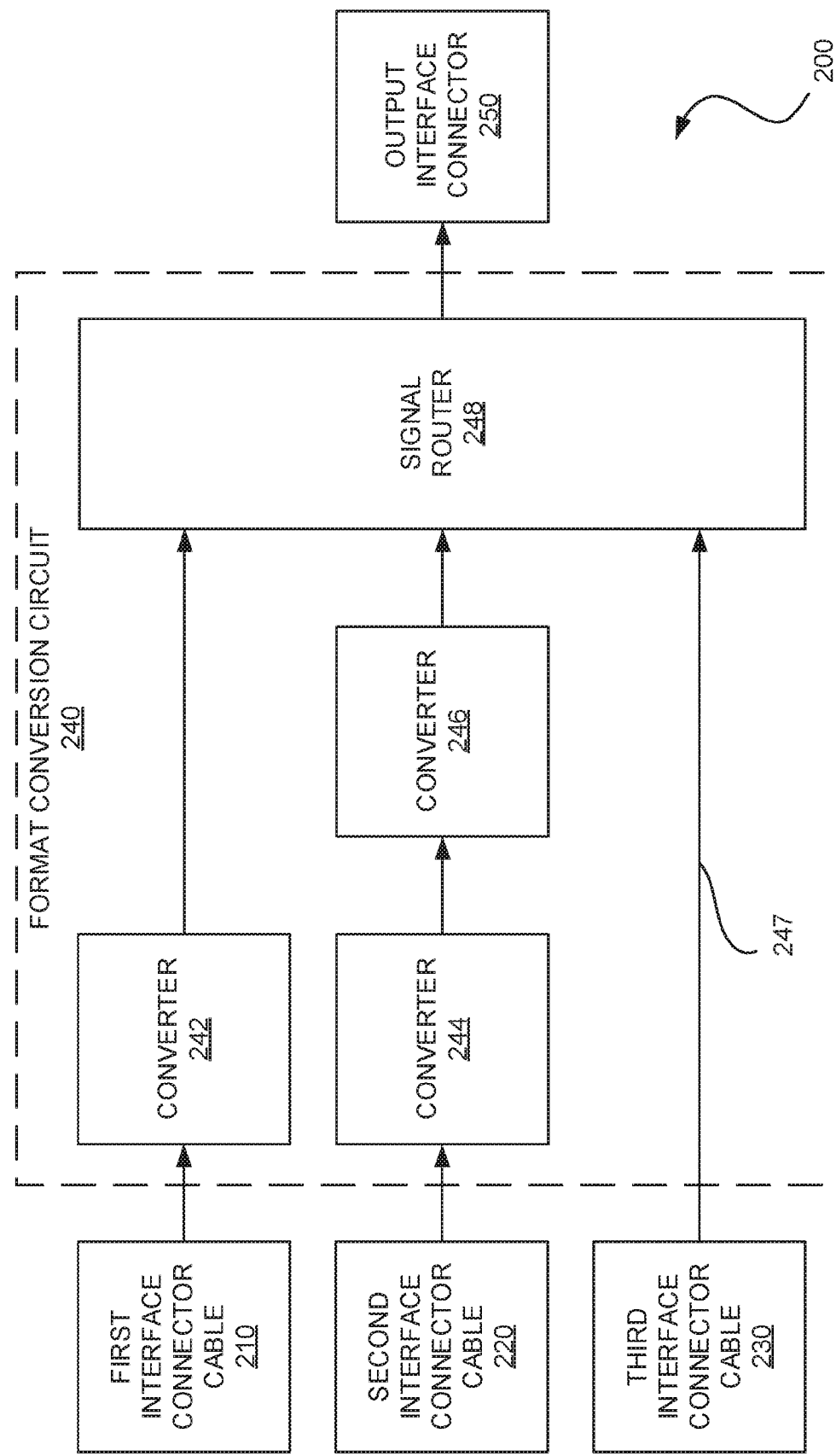
FIG. 2 is a schematic diagram of another example video ingestion cable.

FIG. 2 is a schematic diagram of another example video ingestion cable 200. The video ingestion cable 200 is similar to the video ingestion cable 100 of FIG. 1, with like elements numbered in a "200" series rather than a "100" series, and thus includes first and second interface connector cables 210 and 220, a format conversion circuit 240, and an output interface connector 250. For further description of the above elements, description of the video ingestion cable 100 of FIG. 1 may be referenced.

However, the video ingestion cable 200 further includes a third interface connector cable 230 to receive a third input video feed formatted according to a third video format. As shown, the third video format is the harmonized video format, and thus the format conversion circuit 240 need not convert the third video feed, but rather includes a pass-through connection 247 to pass through directly.

The format conversion circuit 240 converts the first and second video feeds to the harmonized video format. In the present example, the format conversion circuit 240 includes a first converter 242 to convert the format of the video feed received by the first interface connector cable 210 directly into the harmonized video format. Further, the format conversion circuit 240 also includes a series of converters 244, 246, to convert the format of the video feed received by the second interface connector cable 220 first into an intermediate video format and second into the harmonized video format. A series of converters 244, 246, may be used to convert an input video feed into a harmonized output video feed using a set of widely available and more cost-effective converters rather than a specialized converter, and assembled to achieve cost-effective conversion of a number of different input video feeds into a single harmonized output video feed. For example, the second interface connector cable 220 may receive the second video feed in the USB-C format. To convert the USB-C format video to HDMI, the converter 244 may convert USB-C first to DP, and second the converter 246 may convert DP to HDMI. Thus, the use of a converter to convert USB-C to HDMI may be avoided.

The format conversion circuit 240 further includes a signal router 248 that routes one of the first video feed, the second video feed, and the third video feed to the output interface connector 250 for output. The signal router 248 may include a controller or other circuitry that permits a single output video feed to be forwarded to the output interface connector 250.

Figure 3:
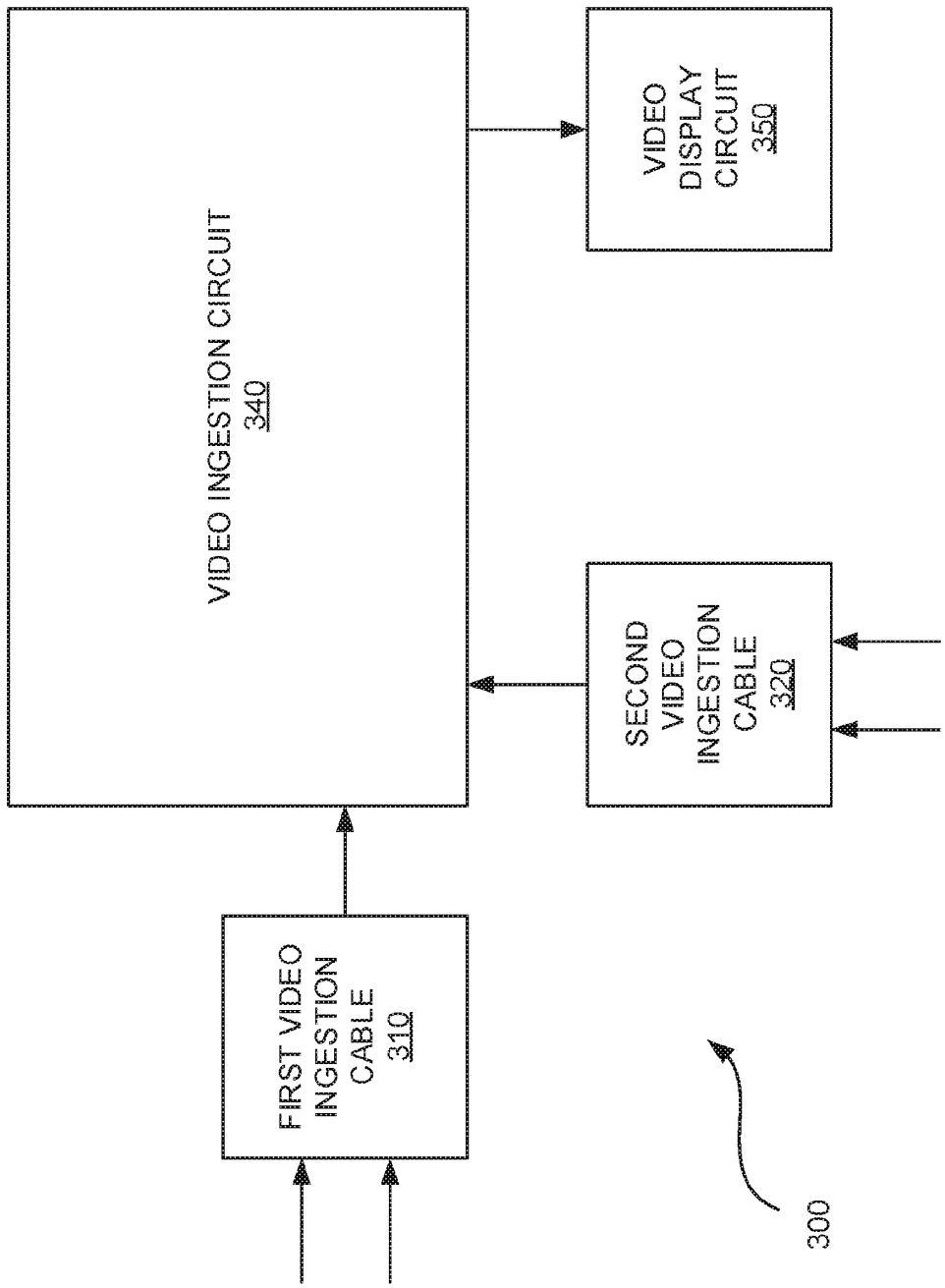
FIG. 3 is a schematic diagram of an example display system.

FIG. 3 is a schematic diagram of an example display system 300. The display system 300 includes a first video ingestion cable 310 and a second video ingestion cable 320, each of which may be similar to the video ingestion cable 100 of FIG. 1. Thus, the video ingestion cable 310 is to receive a first input video feed formatted according to one of a first video format and a second video format, and to transmit a first output video feed formatted according to a harmonized video format. Further, the second video ingestion cable 320 is to receive a second input video feed formatted according to one of the first video format and the second video format, and to transmit a second output video feed formatted according to the harmonized video format. As discussed above with respect to the video ingestion cable 100 of FIG. 1, one of the first video format and the second video format may be the harmonized video format, and thus the first and second video ingestion cables may convert an input video feed to the harmonized video format or pass through an input video feed that is already formatted according to the harmonized video format.

The display system 300 further includes a video ingestion circuit 340 to receive the first output video feed and the second output video feed and transmits a video feed to a video display circuit 350 for display at a display device. In some examples, the video ingestion circuit 340 and video display circuit 350 may be included in a display device, and in other examples, the video ingestion circuit 340 may be implemented in a separate video ingestion unit that forwards video to the display device. The video ingestion cables 310, 320, may be removably connected to the video ingestion circuit 340, or may be fixed to the video ingestion circuit 340.

The video ingestion circuit 340 may receive the first and second output video feeds simultaneously, in which case the video ingestion circuit 340 selects one of the first output video feed and second output video feed as a prioritized output video feed to be transmitted to the video display circuit 350. The prioritized output video feed may be selected based on an order in which the first input video feed and the second input video feed were received, or, in examples in which the first and second video ingestion cables 310, 320 are removable, an order in which the first and second video ingestion cables 310, 320 were connected to the video ingestion circuit 340. In other words, the video ingestion circuit 340 may select the first output video feed as the prioritized output video feed if the first video ingestion cable 310 was connected to the video ingestion circuit 340 after the second video ingestion cable 320, and the video ingestion circuit 340 may select the second output video feed as the prioritized output video feed if the second video ingestion cable 320 was connected after the first video ingestion cable 310.

Thus, multiple mobile electronic device which natively output video feeds according to different video formats may transmit a harmonized video format to a display device. The different video feeds may be transmitted simultaneously, in which case, a prioritized video feed is selected for display. Such a display system 300 further facilitates the sharing of video inputs from multiple different mobile electronic devices.

Figure 4:
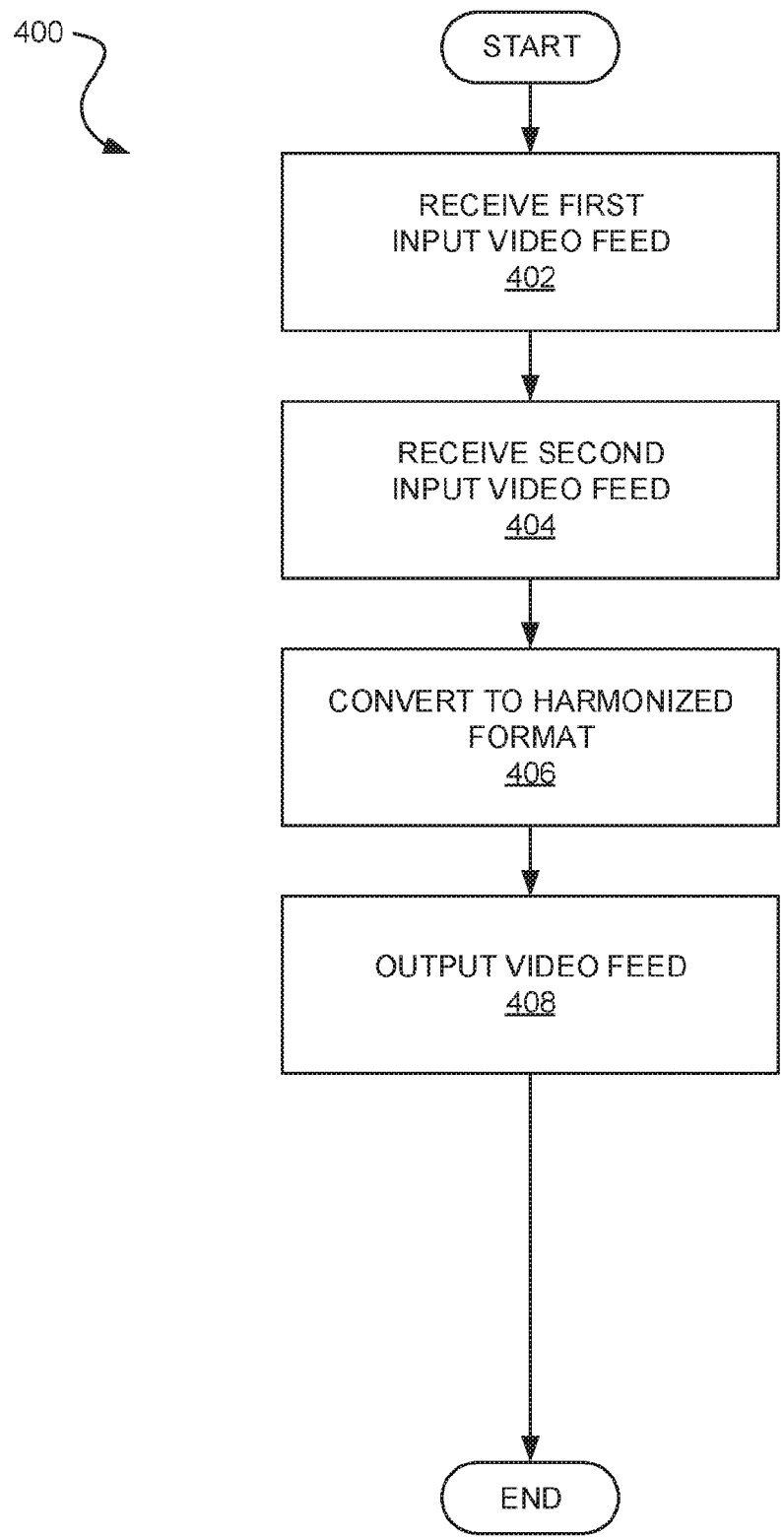
FIG. 4 is a flowchart of an example method for harmonizing video formats for video ingestion.

FIG. 4 is a flowchart of an example method 400 for harmonizing video formats for video ingestion. The method 400 may be performed using a device as described herein, the display system 300 of FIG. 3, but this is not limiting.

The method 400 involves, at block 402, receiving a first input video feed formatted according to a first video format. The method 400 further involves, at block 404, receiving a second input video feed formatted according to a second video format. Blocks 402 and 404 may be executed simultaneously or in any order. As discussed herein, one or neither of the input video feeds may be compatible with a harmonized video format.

The method 400 further involves, at block 406, converting one of the first input video feed and the second input video feed to a harmonized video format. The method 400 may further involve converting both of the input video feeds to the harmonized video format, or alternatively, passing through one of the video feeds that is already formatted according to the harmonized video format. The method 400 further involves, at block 408, outputting one of the first input video feed and the second input video feed as an output video feed, which is formatted according to the harmonized video format, for display, thereby facilitating the sharing of video from different mobile electronic devices, as discussed herein.

As discussed herein, the method 400 may further involve, prior to outputting the output video feed for display, prioritizing one of the first input video feed and the second input video feed for output as the output video feed based on an order in which the first input video feed and the second input video feed were received, there by facilitating the simultaneous sharing of video from different mobile electronic devices, as discussed herein.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A video ingestion cable, comprising:
   a first video interface connector cable to receive a first video feed that is formatted according to a first video format;
   a second video interface connector cable to receive a second video feed that is formatted according to a second video format;
   a format conversion circuit to:
      receive the first video feed from the first video interface connector cable;
      apply the first video feed to a converter circuit to convert the first video feed to a first converted video feed such that the first converted video feed is formatted according to a harmonized video format instead of the first video format;
      receive the second video feed from the second video interface connector cable;
      apply the second video feed to a pass through connection such that the second video feed passes through the format conversion circuit without being converted; and
      select the first converted video feed or the second video feed as a prioritized output video feed, wherein the format conversion circuit is to select the first converted video feed as the prioritized output video feed responsive to determining that the first video feed was received at the format conversion circuit before the second video feed, and wherein the format conversion circuit is to select the second video feed as the prioritized output video feed responsive to determining that the second video feed was received at the format conversion circuit before the first video feed; and
   an output interface connector to transmit the prioritized output video feed formatted according to the harmonized video format to a display device.

2. The video ingestion cable of claim 1, wherein the harmonized video format is the second video format.

3. The video ingestion cable of claim 1, wherein:
   the first video interface connector cable comprises a High-Definition Multimedia Interface (HDMI) connector cable; and
   the second video interface connector cable comprises a Universal Serial Bus Type-C (USB-C) connector cable or a DisplayPort (DP) connector cable.

4. The video ingestion cable of claim 1, wherein:
   the first video interface connector cable comprises a first male connector to interface with a first female connector of a first video source device; and
   the second video interface connector cable comprises a second male connector to interface with a second female connector of a second video source device.

5. The video ingestion cable of claim 4, wherein:
   the first male connector physically inhibits the first video interface connector cable from simultaneously connecting to more than the first video source device; and
   the second male connector physically inhibits the second video interface connector cable from simultaneously connecting to more than the second video source device.

6. The video ingestion cable of claim 1, further comprising a third video interface connector cable to receive a third video feed that is formatted according to a third video format, wherein:
   the converter circuit comprises a first converter circuit;
   the format conversion circuit is to receive the third video feed from the third video interface connector cable and apply the third video feed to both a second converter circuit and a third converter circuit to convert the third video feed to a second converted video feed such that the second converted video feed is formatted according to the harmonized video format; and
   the format conversion circuit is to select the second converted video feed as the prioritized output video feed responsive to determining that the third video feed was received at the format conversion circuit before the first video feed and before the second video feed.

7. The video ingestion cable of claim 6, wherein the format conversion circuit comprises a controller to select the prioritized output video feed.

8. A display system, comprising:
   a first video ingestion cable configured to:
      receive a first video feed that is formatted according to a first video format;
      apply the first video feed to a first converter circuit of the first video ingestion cable to convert the first video feed to a first converted video feed such that the first converted video feed is formatted according to a harmonized video format;
      receive a second video feed that is formatted according to a second video format; and
      apply the second video feed to a pass through connection of the first video ingestion cable such that the second video feed passes through the format conversion circuit without being converted;
   a second video ingestion cable to:
      receive a third video feed that is formatted according to a third video format; and
      apply the third video feed to a second converter circuit of the second video ingestion cable to convert the third video feed to a second converted video feed such that the second converted video feed is formatted according to the harmonized video format; and
   a video ingestion circuit to:
      receive at least one of the first converted video feed or the second video feed from the first video ingestion cable;
      receive the second converted video feed from the second video ingestion cable;
      select one of the first converted video feed, the second video feed, or the second converted video feed as a prioritized output video feed, wherein the video ingestion circuit is to select the first converted video feed or the second video feed as the prioritized output video feed responsive to determining that the first video ingestion cable was connected to the video ingestion circuit before the second video ingestion cable was connected to the video ingestion circuit, and wherein the video ingestion circuit is to select the second converted video feed as the prioritized output video feed responsive to determining that the second video ingestion cable was connected to the video ingestion circuit before the first video ingestion cable was connected to the video ingestion circuit; and transmit the prioritized output video feed to a video display circuit.

9. The display system of claim 8, wherein the harmonized video format comprises the second video format.

10. The display system of claim 8, wherein:
the first video format comprises a High-Definition Multimedia Interface (HDMI) format;
the second video format comprises a Universal Serial Bus Type-C (USB-C) format;
the third video format comprises a DisplayPort (DP) format; and
the first video ingestion cable and the second video ingestion cable are connectable to and removable from the video ingestion circuit.

11. The display system of claim 8, wherein the first video ingestion cable and the second video ingestion cable are fixed to the video ingestion circuit.

12. The display system of claim 8, wherein:
the first video ingestion cable comprises a first male connector to interface with a first female connector of a first video source device to receive the first video feed;
the first video ingestion cable comprises a second male connector to interface with a second female connector of a second video source device to receive the second video feed; and
the second video ingestion cable comprises a third male connector to interface with a third female connector of a third video source device to receive the third video feed.

13. The display system of claim 8, wherein:
the first male connector comprises a High-Definition Multimedia Interface (HDMI) connector;
the second male connector comprises a Universal Serial Bus Type-C (USB-C) connector; and
the third male connector comprises a DisplayPort (DP) connector.

14. A method, comprising:
receiving, at a video ingestion cable, a first input video feed via a first connector of the video ingestion cable that is formatted according to a first video format;
receiving, at the video ingestion cable, a second input video feed via a second connector of the video ingestion cable that is formatted according to a second video format;
receiving, at the video ingestion cable, a third input video feed via a third connector of the video ingestion cable that is formatted according to a third video format;
applying the first input video feed to a first converter circuit of the video ingestion cable to convert the first input video feed to a first converted video feed such that the first converted video feed is formatted according to a harmonized video format;
applying the second input video feed to both a second converter circuit and a third converter circuit of the video ingestion cable to convert the second input video feed to a second converted video feed such that the second converted video feed is formatted according to the harmonized video format;
applying the third input video feed to a pass through connection of the video ingestion cable responsive to determining that the third video format is the harmonized video format such that the third input video feed passes through the video ingestion cable without being converted;
selecting, at the video ingestion cable, one of the first converted video feed, the second video feed, or the second converted video feed as a prioritized output video feed based on an order in which the first converted video feed, the second video feed, and the second converted video feed were received at the video ingestion cable; and
providing, as output from the video ingestion cable, the prioritized output video feed for display.

15. The method of claim 14, wherein selecting the prioritized output video feed comprises selecting the prioritized output video feed based on which of the first converted video feed, the second video feed, or the second converted video feed was received earliest at the video ingestion cable.

16. The method of claim 15, wherein:
the first connector comprises a first male connector to interface with a first female connector of a first video source device;
the second connector comprises a second male connector to interface with a second female connector of a second video source device; and
the third connector comprises a third male connector to interface with a third female connector of a third video source device.

17. The method of claim 14, wherein:
the first connector comprises a High-Definition Multimedia Interface (HDMI) connector;
the first video format comprises an HDMI format;
the second connector comprises a Universal Serial Bus Type-C (USB-C) connector;
the second video format comprises a USB-C format;
the third connector comprises a DisplayPort (DP) connector; and
the third video format comprises a DP format.

18. The method of claim 14, wherein applying the second input video feed to both the second converter circuit and the third converter circuit comprises:
applying the second input video feed to the second converter circuit to convert the second input video feed to an intermediate video feed such that the intermediate video feed; and
applying the intermediate video feed to the third converter circuit to convert the intermediate video feed to the second converted video feed such that the second converted video feed is formatted according to the harmonized video format.

19. The method of claim 14, wherein providing, as output from the video ingestion cable, the prioritized output video feed for display comprises providing, by a signal router of the video ingestion cable, the prioritized output video feed for display.

20. The method of claim 14, wherein:
the video ingestion cable comprises a first video ingestion cable; and
providing, as output from the video ingestion cable, the prioritized output video feed for display comprises providing, as output from the video ingestion cable, the prioritized output video feed to a video ingestion circuit that is configured to interface with both the first video ingestion cable and a second video ingestion cable.

* * * * *